(12) United States Patent
Marin et al.

(10) Patent No.: US 8,276,421 B2
(45) Date of Patent: Oct. 2, 2012

(54) RE-TURNING PLANT FOR ROLLERS OF A ROLLING MILL

(75) Inventors: Paolo Marin, Vigevano (IT); Marcello Pacher, Milan (IT); Giuseppe Cavone, Milan (IT)

(73) Assignee: SMS Innse S.p.A., San Donato Milanese (IT)

( * ) Notice: Subject to any disclaimer, the term of this patent is extended or adjusted under 35 U.S.C. 154(b) by 457 days.

(21) Appl. No.: 12/529,644

(22) PCT Filed: Mar. 9, 2007

(86) PCT No.: PCT/IT2007/000175
§ 371 (c)(1),
(2), (4) Date: Sep. 24, 2009

(87) PCT Pub. No.: WO2008/122995
PCT Pub. Date: Oct. 16, 2008

(65) Prior Publication Data
US 2010/0058825 A1 Mar. 11, 2010

(51) Int. Cl.
*B21B 28/02* (2006.01)
(52) U.S. Cl. .......................................................... 72/236
(58) Field of Classification Search .................... 72/236, 72/237, 40; 29/895.1, 81.01, 81.13; 451/21, 451/22, 49, 209
See application file for complete search history.

(56) References Cited

U.S. PATENT DOCUMENTS
4,827,751 A * 5/1989 Holthoff .......................... 72/236

FOREIGN PATENT DOCUMENTS
| DE | 10 37 803 B | 8/1958 |
| DE | 3631 146 A1 | 3/1988 |
| EP | 0 335 286 A2 | 10/1989 |
| EP | 0 689 883 A2 | 1/1996 |

* cited by examiner

*Primary Examiner* — Debra Sullivan
(74) *Attorney, Agent, or Firm* — Dickstein Shapiro LLP (57) ABSTRACT

A re-turning plant (1) for rollers (7) of rolling mills of the type comprising at least one roller stand (1) and a plurality of rollers (7) mounted to respective arms (6) pivoting in the plane of the roller stand (1) about respective pins (8) that are fixed to the roller stand (1), the rollers (7) being positioned within the roller stand (1) in a work position in which work surfaces (9) of the rollers (7) determine the outer profile of a body to be rolled, wherein the re-turning plant (1) comprises a support structure (12) configured to support the whole roller stand (1) in a turning position, a tool-holding device (13) that can be displaced in contact with the work surfaces (9) of each roller (7) of the plurality of rollers (7) fixed in the roller stand (1) and mandrel means (14) with means (15, 16) that can be rotatably coupled to each roller (7) of the plurality of rollers (7) fixed to the roller stand (1) to rotate the same substantially in the work position.

19 Claims, 6 Drawing Sheets

RE-TURNING PLANT FOR ROLLERS OF A ROLLING MILL

BACKGROUND OF THE INVENTION

The object of the present invention is a re-turning plant for rollers of a rolling mill, and particularly for rollers in rolling mills with three or more rollers.

Accordingly, the present invention relates to the technical field of rolling metal rod-like bodies, particularly weldless tubes, and also slabs, bars, wire rods, and the like.

The rolling of these rod-like products (reference will be made herein below mainly to tubes, without however excluding the application to other types of rod-like bodies obtainable by means of rolling) is carried out in rolling mills having a plurality of stands, or rolling units, with two counter-posed rollers or with three ore more rollers configured such as to determine the outer profile of the tube desired to be obtained.

An important aspect relating to the maintenance of the rolling mills considered herein is the periodical re-turning of the rollers thereof. In fact, work surface of the latter, which is configured with the characteristic groove-like profile, is subject to wear or inevitably damaged over time, such that the rollers require to be re-turned after a given period of time, in order to maintain a good work quality.

The re-turning operations on the rollers require disassembling the rollers from the roller stand, hoisting them to a re-turning plant, when they are individually re-turned, and re-assembling and re-positioning them within the roller stand.

These operations are time and labour consuming. Furthermore, also due to slight differences between the roller support in the re-turning plant and the roller support in the roller stand, both of them can experience incorrect positioning, thus resulting in imperfections of the work surfaces (grooves) of the individual rollers after they have been re-assembled and re-positioned in the roller stand.

BRIEF SUMMARY OF THE INVENTION

Accordingly, the object of the present invention is to provide a plant for re-turning rollers of rolling mill, having such characteristics as to reduce the time required for the re-turning operations and increase the precision in the shape and mutual positioning of the roller work surfaces after re-turning.

During lathe work, a layer of material is removed from the roller work surface, the profile being however maintained unchanged, since it has to correspond to the outer profile of the tubes to be rolled. Consequently, at the end of the re-turning, the rollers have a nominal diameter, which is reduced by a value equal to twice the thickness of the removed material.

In order to maintain the preset diameter of the tubes to be rolled, the reduction in the nominal diameter of the rollers must be necessarily compensated by repositioning the latter within the rolling stand. To the purpose, each individual roller is supported by an arm that is pivotally fixed to the stand by means of a hinge pin, which can be, in turn, adjusted in position.

These and other objects are achieved by means of a re-turning plant for rollers of a type comprising at least one roller stand and a plurality of rollers mounted to respective arms pivoting in the plane of the roller stand about respective pins fixed to the roller stand, said rollers being positioned within the roller stand in a work position in which work surfaces of the rollers determine the outer profile of a body to be rolled, wherein the re-turning plant comprises:

a roller-support structure;

a tool-holding device that can be displaced relative to the roller-support structure such as to be capable of placing the tool in contact with said work surface of the roller in order to carry out the working on the latter;

mandrel means that can be coupled to the roller and suitable to rotate the latter, wherein:

the support structure is configured to support the whole roller-stand in a turning position, the tool-holding device can be displaced in contact with the work surfaces of each roller in the plurality of rollers fixed in the roller-holding stand, substantially in the work position, when the whole roller stand is supported by the support structure in the turning position, the mandrel means comprise means that can be rotatably coupled to each roller of the plurality of rollers fixed in the roller stand, in order to rotate the roll substantially in its work position when the whole roller stand is supported by the support structure in the turning position.

BRIEF DESCRIPTION OF THE DRAWINGS

In order to better understand the invention and appreciate the advantages thereof, a non-limiting exemplary embodiment of the same will be described below, with reference to the annexed drawings, in which.

DETAILED DESCRIPTION OF THE INVENTION

Figure 1:
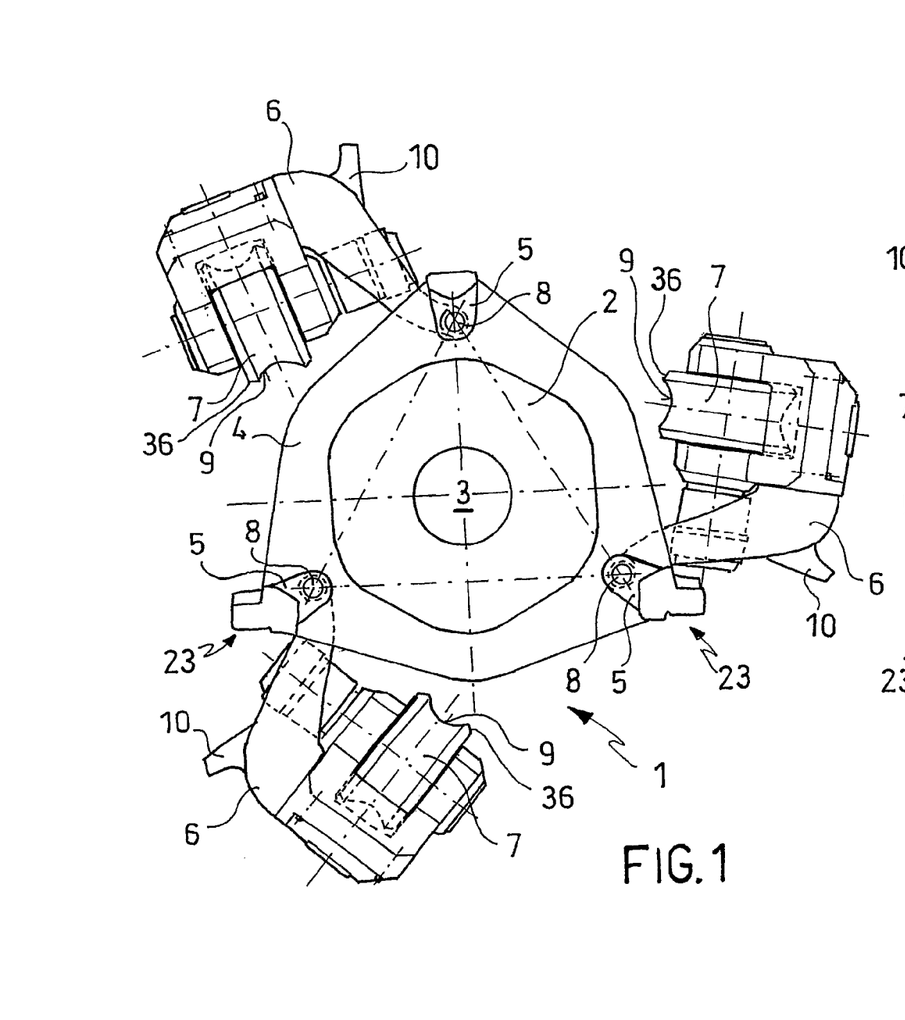
FIG. 1 is a front view of a three-roller stand in the opened configuration.
Figure 2:
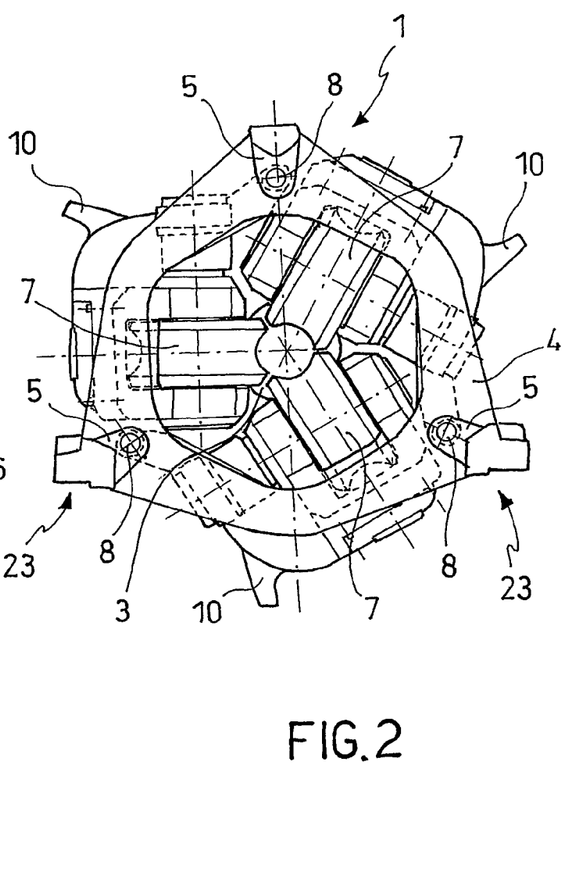
FIG. 2 is a front view of the three-roller stand in a work configuration.

With reference to the figures, and in order to better appreciate the advantages of the re-turning plant according to the invention, a brief description will be first provided herein of a roller stand with three or more rollers with particular reference to FIGS. 1 and 2.

A roller stand with three or more rollers is generally designated with reference 1. The roller stand 1 comprises a bottom wall 2 in which an opening 3 is centrally formed for the rod-like bodies to pass therethrough, particularly tubes being worked, as well as a stiffening body 4 substantially flat frame-configured and frontally connected to the bottom wall 2. In the particular case of a three-roller stand, the stiffening body 4 is connected to the bottom wall 2 by means of three connecting blocks 5. The bottom wall 2 and the stiffening body 4 can have an approximatively polygonal shape, such that an approximatively polygonal outer edge thereof fits the spaces provided within a rolling mill in an optimum manner.

The shape of the bottom wall 2 and stiffening body 4, however, may be changed according to the space conditions in the rolling mill for which the stand has been designed.

The connecting blocks 5 are preferably arranged at a constant angular pitch in the vicinity of the outer edge of the roller stand 1. At each of the connecting blocks 5, a seat is further arranged for supporting an arm 6 pivoting about an axis parallel to the theoretical rolling axis L, respectively. A roller 7 is fixed to each arm 6, respectively, in a pivoting manner about a roller axis R transversal to (and more precisely perpendicular to) the rolling axis L.

In accordance with an embodiment, the seats for the pivoting support of the arms 6 comprise hinge pins 8 that can be connected to the stiffening body 4 such as to allow adjusting the position thereof. By way of illustrative example, each hinge pin 8 can be connected to the stiffening body 4 by means of a double-eccentric mechanism, wherein a first eccentric allows a first displacement of the fulcrum (hinge pin 8) of the arm 6 along a first trajectory such as to radially move the respective roller 7 towards the rolling axis L, and wherein a second eccentric allows a second displacement of the fulcrum (hinge pin 8) of the arm 6 along a second trajectory such as to compensate an undesired lateral component of the first displacement. These displacements of the rotation fulcrum of the arms 6 together with the oscillation of the arms 6 about the respective hinge pins 8 allow an adjustment of the position of the rollers 7 within the roller stand 1 for compensating the reduction in the nominal diameter thereof after re-turning.

FIG. 1 shows a three-roller stand in an opened configuration, wherein the three arms 6 with the respective rollers 7 are turned outwardly of the stand. FIG. 2 shows the same roller stand as in FIG. 1 in a closed or working configuration, wherein the arms 6 with the respective rollers 7 are turned inwardly, in the plane of the roller stand, such that the work surfaces 9 of the rollers 7 define a rolling profile corresponding to the outer profile of the rod-like body to be worked, in the particular example of a circular cross-section tube.

In the work condition, a plurality of rolling stands 1 is arranged in series in a bearing structure of a rolling mill (not shown) and each roller stand 1 is locked in position due to clamping means (the so-called pushers) which act in the longitudinal direction of the rolling mill, and optionally further clamping means acting transversally to the longitudinal direction of the rolling mill, for example, a vertical pusher abutting against one of the connecting block 5 of the stiffening body 4.

In the rolling mill, the adjustment of the position of the arms 6 is usually carried out by means of main hydraulic cylinder-piston assemblies connected to the bearing structure of the rolling mill, and configured to carry out a thrust suitable to displace or bias the arms 6 to their work configuration.

In order to maintain the arms 6 permanently in contact with said main cylinder-piston assemblies, secondary thrust means are provided, such as lever or rocker arm mechanisms connected to the bearing structure of the rolling mill and hydraulically driven. These secondary thrust means act on projections 10 formed in the arms 6 such as to move or bias these arms 6 towards or in contact with the piston of the main cylinder-piston assemblies.

Alternatively, the secondary thrust means can be elastic means directly supported by the roller stand 1.

During the rolling operation, the rolling means 7 are rotatably coupled with motor means supported by the bearing structure of the rolling mill and driven such as to give the preset rotation to each roller 7 for rolling the rod-like element. The rotary coupling between the motor means and the rollers 7 is carried out either directly or by the interposition of a drive shaft 16 which can be removably connected to the relative roller 7.

After this brief description of the roller stands, of which the rollers require a periodical re-turning and while bearing in mind the current difficulties in carrying out the re-turning of individual rollers and the re-mounting of the latter within the roller stand such as to perfectly restore the rolling profile, several embodiments of a re-turning plant 11 will be described herein below with particular reference to FIGS. 3 to 11.

Figure 3:
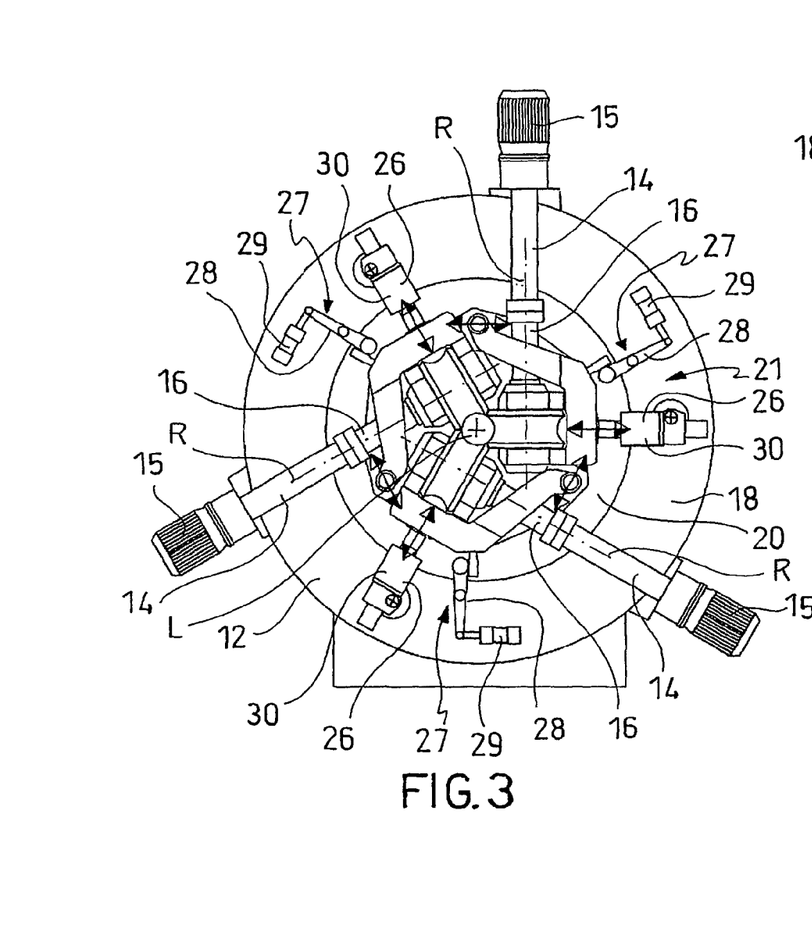
FIG. 3 is a front view of a re-turning plant according to an embodiment of the invention, wherein a part of the roller stand has been removed.
Figure 4:
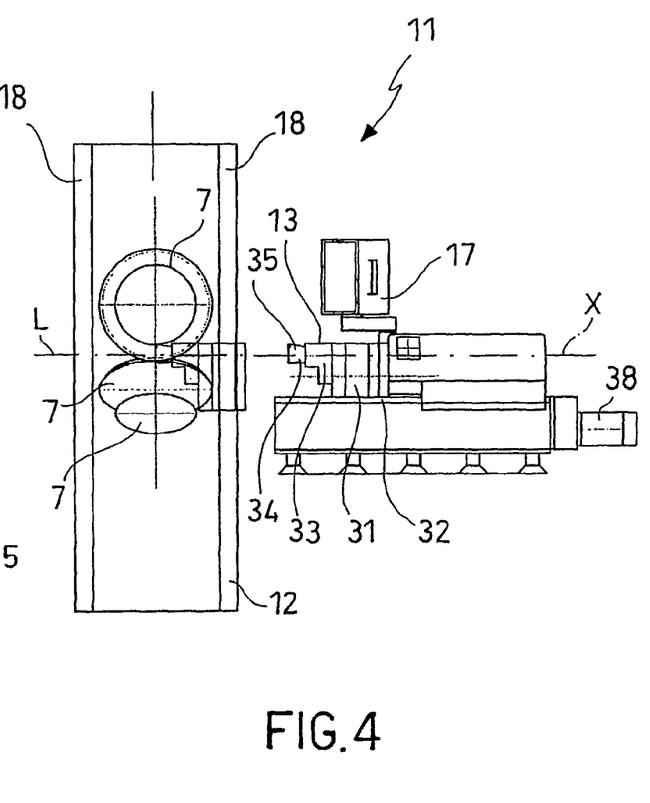
FIG. 4 is a schematic side view of the re-turning plant in FIG. 3.

The re-turning plant 11 comprises a support structure 12 suitable to support the roller 7 to be re-turned, a tool-holding device 13 that can be displaced relative to the support structure 12 such as to be capable of placing the tool in contact with the work surface 9 of the roller 7 to carry out the processing thereon, as well as mandrel means 14 that can be coupled to the roller 7 and are suitable to pivot the latter.

According to the invention, the support structure 12 is configured to support the whole roller stand 1 in a turning position and the tool-holding device 13 can be displaced in contact with the work surfaces 9 of each roller 7 of the plurality of rollers 7 when the latter are stationary within the roller stand 1 substantially in the work configuration and when the whole roller stand 1 is supported by the support structure 12 in the turning position. Furthermore, the mandrel means 14 comprise means that can be rotatably coupled to each roller 7 of the plurality of rollers 7 fixed to the roller stand in order to rotate the same substantially to the work configuration when the whole roller stand when the whole roller stand is supported from the support structure 12 in the turning position.

In accordance with an embodiment, the mandrel means 14 comprise, for each roller 7 of the roller stand 1 a dedicated rotary actuator 15, such as an electric motor connected to the support structure 12 and having a rotor that can be rotatably integrally coupled to the respective roller 7 or an extension member, such as the so-called drive shaft 16, which is, in turn, rotatably integral with the roller 7.

Each rotary actuator 15 is connected to a control unit 17 of the re-turning plant 11, which control unit 17 is configured such as to operate each rotary actuator 15 either individually or a synchronized manner, or depending on the operation of one or more of the other rotary actuators 15. According to an embodiment provided for re-turning the rollers 7 of a three-roller stand, three rotary actuators 15 are provided, which are arranged at an angular pitch of about 120° relative to the theoretical rolling axis L.

The support structure 12 preferably comprises two parallel annular walls 18 that are spaced apart and connected with each other by means of a plurality of connecting portions 19 of which the number preferably corresponds to the number of arms 6 (and thus to the number of rollers 7) of the roller stand 1 to be subjected to re-turning.

In the case of a three-roller stand, three connecting portions 19 are provided, which are arranged at an angular pitch of about 120°.

The support structure 12 thus defines a central through opening 20 suitable to accommodate the roller stand 1 and an access space 21 between the two annular walls 18 allowing the access on the side of the various aggregates (particularly, the mandrel means 14 and adjusting means 26, 27 which will be described herein below) of the plant 1 to the roller stand 1. According to the particular embodiment, the support structure 12 can be configured such as to allow the roller stand 1 to be housed via axial or side insertion.

In order to position and fix the roller stand 1 in the turning position in the support structure 12, one or more, preferably two support plates 22 are provided, which are suitable to support corresponding rest portions 23 of the roller stand 1, and clamping means, such as threaded or hydro-dynamic thrust means 24, 25 that are connected to the support structure 12 and suitable to lock the roller stand 1 into abutment against the support plates 22.

According to an embodiment, the clamping means 24, 25 can be adjusted such as to be capable of adjusting the turning position of the whole roller stand 1 in the support structure 12 in at least one first direction transversal to the theoretical rolling axis L (for example, in the vertical direction) and, preferably, in at least one second direction (such as in the horizontal direction) transversal and/or parallel to the theoretical rolling axis L and transversal to the first direction of adjustment.

Figure 8:
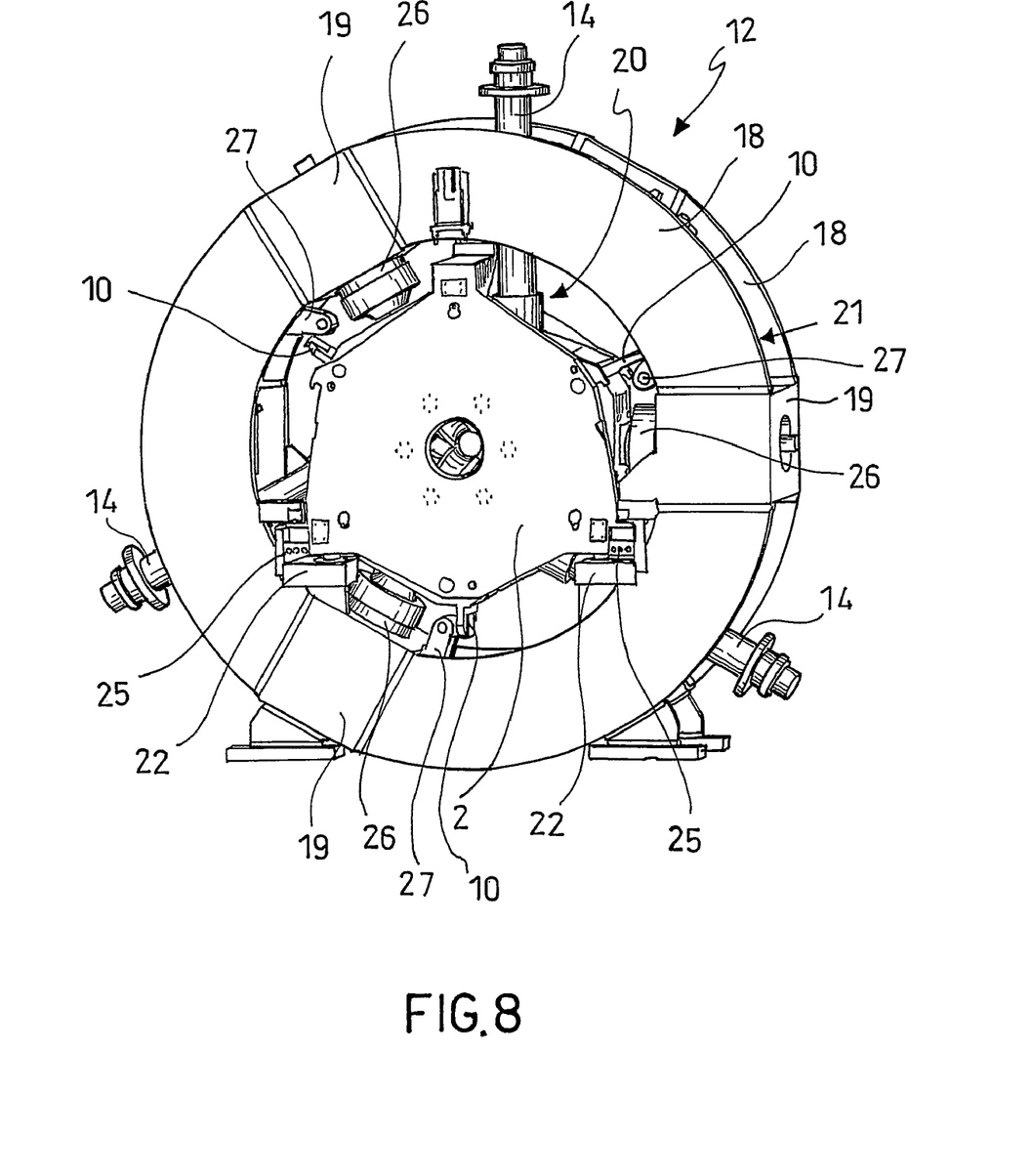
FIG. 8 is a front view of the re-turning plant according to an embodiment carrying a three-roller stand.
Figure 9:
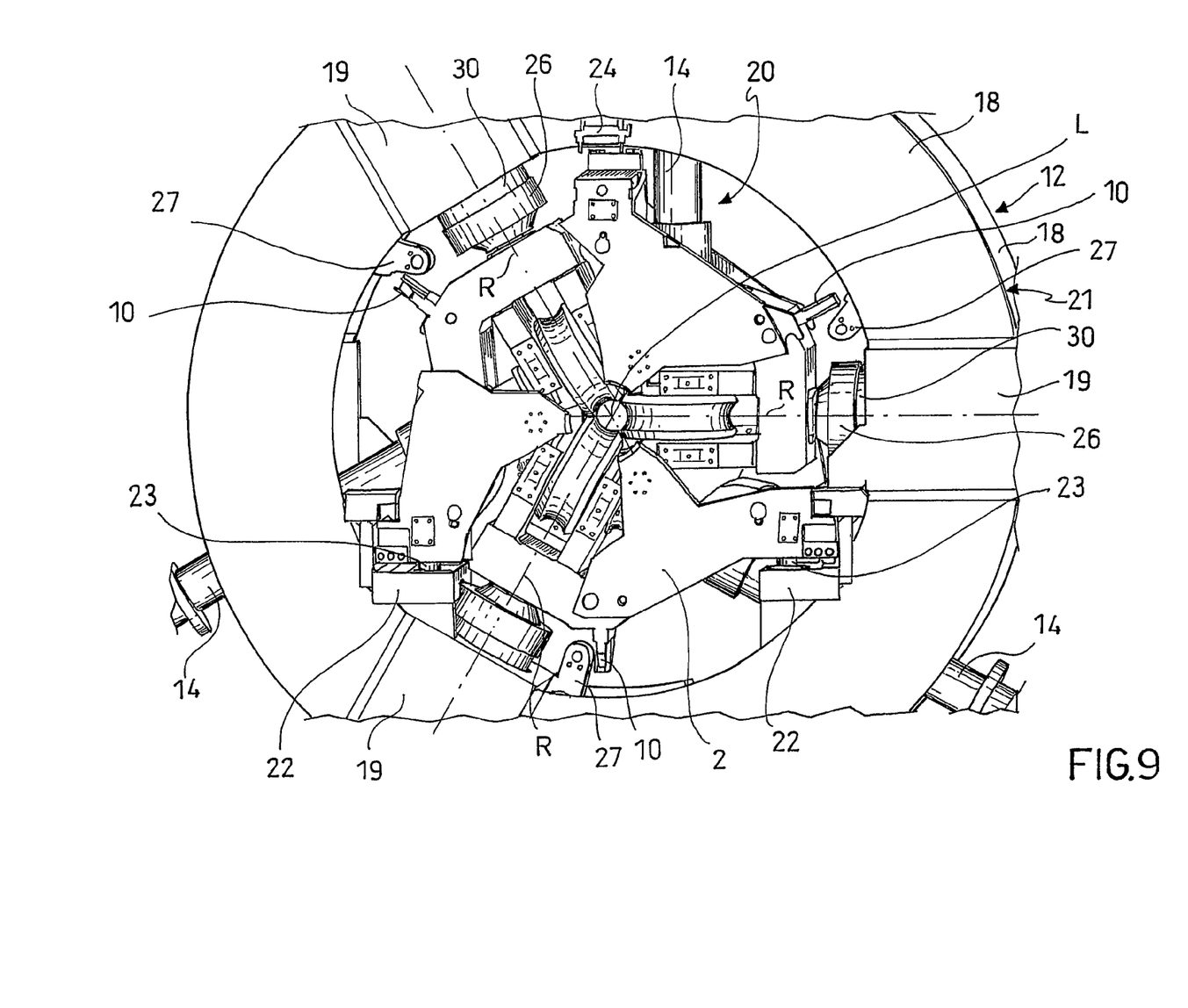
FIG. 9 is an enlarged front view of a detail of the re-turning plant in FIG. 7, in which a part of the roller stand has been removed.
Figure 10:
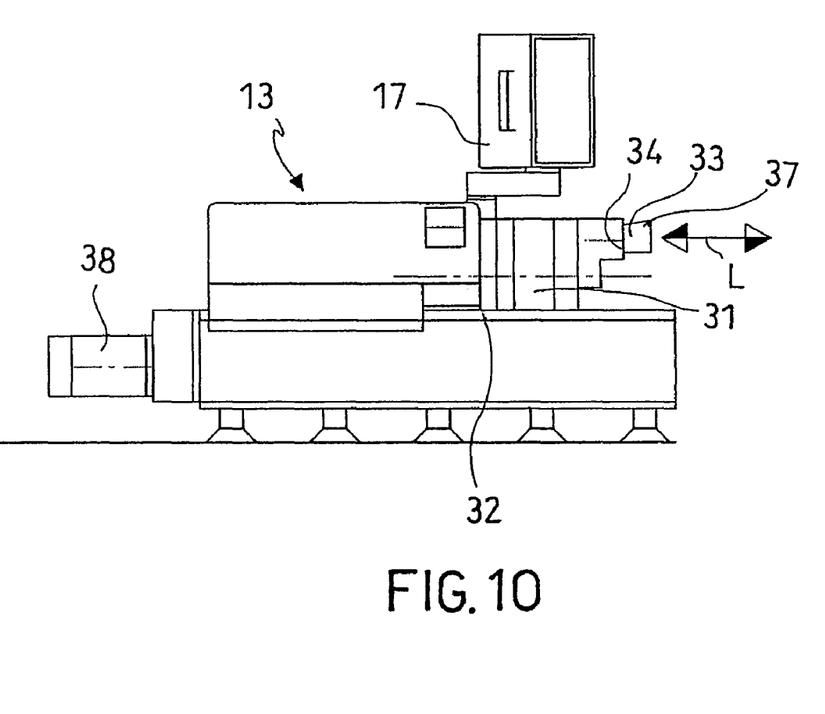
FIG. 10 is a side view of a functional group of the re-turning plant according to an embodiment of the invention.
Figure 11:
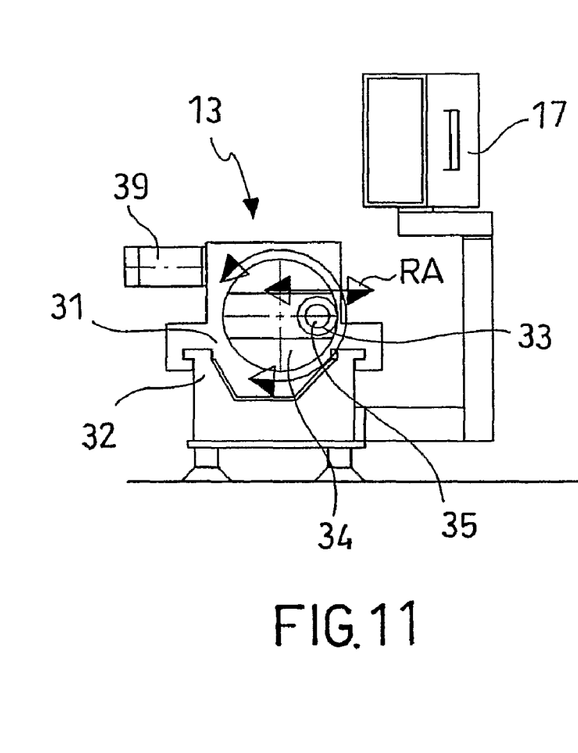
FIG. 11 is a rear view of the functional group in FIG. 10.

With reference to the embodiment illustrated in FIG. 8, the two support plates 22 are arranged in the lower part of the support structure and define together a substantially horizontal support plane, but preferably inclinable by means of an adjustment of the height of the support plates 22. The clamping means can comprise an upper cylinder-piston assembly 24 or, alternatively, a linear electric actuator, or a screw actuator, arranged in the upper part of the support structure 12 substantially opposite the position of the support plates 22 and suitable to bias the roller stand 1 against the latter. Thereby, a direct locking of the roller stand 1 is obtained in the transversal direction to the theoretical rolling axis L as well as in an direct locking by friction in the direction of this axis L.

In order to lock the roller stand 1 directly in the direction of the theoretical rolling axis L, further clamping means 25 can be provided, which act in the direction of the theoretical rolling axis L, and which are preferably arranged such as to abut against the roller stand proximate to the connecting blocks 5.

In accordance with an embodiment, the clamping means 24, 25 can be manually operated and adjusted. In accordance with an alternative embodiment, the clamping means 24, 25 are connected to the control unit 17 of the re-turning plant 11, which control unit 17 is configured such as to operate the clamping means 24, 25 and adjust the position of the roller stand 1, preferably depending on the operation of the other aggregates and functional groups of plant 11 (such as the rotary actuators 15 and/or adjusting means 26, 27 and/or moving means of the tool-holding device 13 which will be described herein below).

In accordance with an embodiment, the re-turning plant 11 further comprises adjusting means suitable to interact with the arms 6 to adjust the position of the rollers 7 in the roller stand 1. These adjusting means comprise thrust means 26 connected to the support structure 12 and configured to push the arms 6 in a direction such as to move the respective rollers 7 towards the theoretical rolling axis L.

In order to ensure a univocal positioning of the rollers 7, the adjusting means further comprise counter-means 27 which are also connected to the support structure 12 and configured to bias the arms 6 into abutment against the thrust means 26.

According to an embodiment, the thrust means 26 comprise a hydraulic cylinder-piston assembly 30 for each arm 6, respectively. Alternatively, the thrust means 26 can comprise linear motors or screw actuators.

The counter-means 27 advantageously comprise a lever mechanism 28 for each arm 6. The lever mechanism 28 is driven by means of a fluid dynamic actuator 29, preferably hydraulic, and configured such as to push against the projection 10 of arm 6 in such a direction as to bias the arm 6 in contact with the piston of the cylinder-piston assembly 30.

According to a preferred embodiment, both the thrust means 26 and the counter-means 27 are arranged in the aggregate access space 21 defined between the two annular walls 18 of the support structure 12 and preferably at a constant angular pitch, for example about 120° in the case of a re-turning plant for rollers in three-roller stands.

In the case of roller stands in which the position of the hinge pins 8 can be adjusted, the plant 11 preferably comprises means for adjusting the position of the arms 6 by means of the rotation of each arm 6 about the hinge pin 8 and by means of the displacement of the pin 8. The function of these means can be carried out, for example, by said thrust 26 and counter-27 means with the optional aid of further guide means defining the trajectory of movement of the arms 6.

Alternatively, the adjustment of the position of the hinge pins 8 can be carried out prior to positioning the roller stand 1 in the turning position within the support structure 12 of the re-turning plant and/or prior to positioning the arms 6 and respective rollers 7 in the work position with the roller stand 1 being locked in the turning position.

The adjusting means 26, 27 are also connected to the control unit 17 of the re-turning plant 11, which control unit 17 is configured such as to operate these adjusting means 26, 27 and thus adjust the position of the rollers 7 during the re-turning operation, preferably depending on the operation of the other aggregates and functional groups of the plant 11 (particularly the rotary actuators 15 and/or clamping means 24, 25 and/or moving means of the tool-holding device 13 which will be described herein below).

Referring back now to the tool-holding device 13, in accordance with an embodiment, it comprises longitudinal moving means for moving the tool along a longitudinal axis X. This longitudinal axis X is coincident with or at least parallel to the theoretical rolling axis L, substantially perpendicular to the axes of rotation R of the individual rollers 7 and substantially normal to the plane of the roller stand 1 when the latter is stationary in the turning position. The tool-holding device 13 further comprises radial moving means for moving the tool in a radial direction RA relative to the longitudinal axis X, as well as rotation means for rotating the tool about the longitudinal axis X.

Preferably, the tool-holding device 13 comprises a tool-holding saddle 31 supported on a guide structure 32 in a displaceable manner along the longitudinal axis X. To this tool-holding saddle 31A is mounted a tool-holding portion in a pivoting manner about the longitudinal axis X, and a tool support 34 connected to the tool-holding portion 33 in a displaceable manner in a radial direction relative to the longitudinal axis X and provided with a gripping member 35 for gripping a tool 37.

Figures 5A, 5B, 6A, 6B, 7:
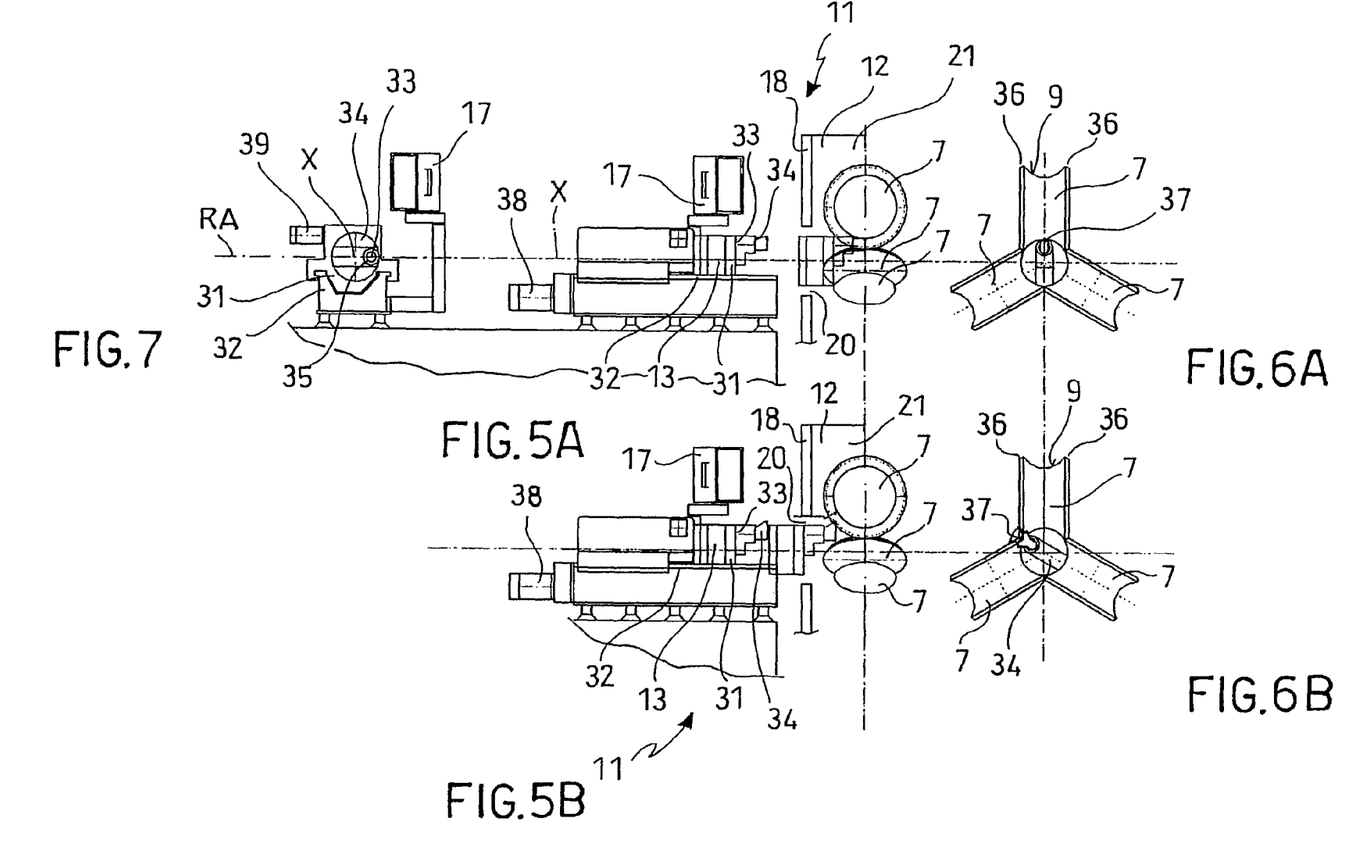
FIG. 5A is a schematic side view of the re-turning plant in FIG. 4 in a rest configuration and in a first work configuration (dotted lines)
FIG. 5B is a schematic side view of the re-turning plant in FIG. 4 in a rest configuration and in a second work configuration (dotted lines)
FIG. 6A is a front view of the rollers intended to be re-turned and a tool in the first work configuration.
FIG. 6B is a front view of the rollers intended to be re-turned and a tool in the second work configuration.
FIG. 7 is a rear partial view of the re-turning plant in FIG. 4.

Thereby, the tool 37 can be guided through the central opening 3 of the roller stand 1 within the space defined by the work surfaces 9 of the rollers 7 and these work surfaces (FIGS. 5A and 6A) can be re-turned. In order to be capable of re-turning also the tabs 36 which are not directly involved in the rolling process, the tool 37 is moved back to a position in which the tool does not interfere with the roller adjacent to that being re-turned (FIGS. 5B and 6B).

The tool-holding device 13 is also preferably connected to the control unit 17 of the re-turning plant 11, which control unit 17 is configured such as to carry out said longitudinal, radial, and rotary movements, such as by means of motor means 38, 39 and motion-transmission means that are associated to the tool-holding saddle 31, tool-holding portion 33 and tool support 34, respectively. The control unit 17 drives these movements of the tool 37, preferably depending on the operation of the other aggregates and functional groups of the plant 11 (particularly the rotary actuators 15 and/or adjusting means 26, 27 and/or clamping means 24, 25).

The control unit 17 is configured such as to carry out the re-turning process in an automated manner based on a given driving program that can be loaded or input into a memory unit of the control unit 17, and thus can be adapted to a plurality of re-turning methods for roller, and roller stands of various types, as well as to be capable of changing the values of the roller nominal diameters as desired.

The plant 11 according to the present invention has a number of advantages. It allows carrying out the re-turning of rollers without requiring to assemble and then disassemble these rollers to/from the roller stand. Furthermore, due to the fact that the rollers can be re-turned in their work configuration within the roller stand, the operations can be directly carried out on the rolling profile such as defined by these rollers when they are operating in the rolling mill. Consequently, a high precision is obtained and the requirement of carrying out further subsequent correcting operations is avoided.

We claim:

1. A re-turning plant (11) for re-turning worn rollers (7) of rolling mills of a type comprising at least one roller stand (1) and a plurality of rollers (7) connected to the roller stand (1) by supporting organs movable in the plane of the roller stand (1), said rollers (7) being positioned within the roller stand (1) in a work position in which work surfaces (9) of the rollers (7) determine the outer profile of a body to be rolled, wherein the re-turning plant (11) comprises:
    a support structure (12) configured to support the roller-stand (1) in a turning position;
    a tool-holding device (13) that can be displaced relative to the support structure (12) such as to be capable of placing a tool (37) in contact with the work surfaces (9) of the rollers (7) while the rollers (7) are substantially in the work position and the roller stand (1) is in said turning position;
    at least one mandrel means (14) that can be coupled to at least one of the rollers (7) in order to rotate the roller (7) while the roller (7) is substantially in the work position and the roller stand (1) is in said turning position;
    a control unit (17) programmed to move the tool-holding device (13) relative to the rollers (7) to re-turn both the working surfaces (9) and lateral tabs (36) of the rollers (7), thereby reducing the nominal diameters of the rollers (7) and restoring the profile of the rollers (7) to that which existed before the rollers (7) became worn; and
    adjusting means configured to interact with said supporting organs for adjustably varying said work position of the rollers (7) in the roller stand (1) to compensate for the reduction in nominal diameter of the rollers (7) after re-turning.

2. The re-turning plant (11) according to claim 1, wherein said mandrel means (14) consists of a dedicated rotary actuator (15) for each roller (7) of the roller stand (1) that can be integrally rotatably coupled to the relative roller (7) or to a drive shaft (16), which is, in turn, integral with the roll (7).

3. The re-turning plant (11) according to claim 2, wherein each rotary actuator (15) can be individually operated.

4. The re-turning plant (11) according to claim 2, wherein each rotary actuator (15) can be operated depending on the operation of one or more of the other rotary actuators (15).

5. The re-turning plant (11) according to claim 2, wherein each rotary actuator (15) comprises an electric motor controlled by said control unit (17).

6. The re-turning plant (11) according to claim 1, wherein said support structure (12) comprises support surfaces suitable to support rest portions (23) of the roller stand (1), and clamping means suitable to lock the roller stand (1) in said turning position.

7. The re-turning plant (11) according to claim 6, wherein said clamping means can be adjusted such as to be capable of adjusting said turning position of the whole roller stand (1) in at least one first direction.

8. The re-turning plant (11) according to claim 7, wherein said support surfaces can be adjusted such as to be capable of adjusting said turning position of the whole roller stand (1) in at least one second direction.

9. The re-turning plant (11) according to claim 1, wherein said tool-holding device (13) comprises:
    means for moving the tool (37) along a longitudinal axis (X) substantially normal to the plane of the roller stand (1) when the latter is supported in the turning position,
    means for moving the tool in a radial direction to said longitudinal axis (X);
    means for rotating the tool (37) about said longitudinal axis (X).

10. The re-turning plant (11) according to claim 9, wherein said movement of the tool along the longitudinal axis (X) is substantially perpendicular to the axes of rotation (R) of the individual rollers (7).

11. The re-turning plant (11) according to claim 9, wherein the means for moving the tool (37) along the longitudinal axis (X) consists of a tool-holding saddle (31) supported on a guide structure (32) in a displaceable manner along said longitudinal axis (X),
    the means for rotating the tool (37) further consists of a tool-holding portion (33) connected to the tool-holding saddle (31) in a pivoting manner about the longitudinal axis (X), and
    the means for moving the tool (37) in the radial direction further consists of a tool support (34) connected to the tool-holding portion (33) in a displaceable manner in a radial direction (RA) to the longitudinal axis (X) and having a gripping member (35) suitable to grip the tool (37).

12. The re-turning plant (11) according to claim 1, wherein said adjusting means comprises:
    thrust means (26) configured to push the supporting organ in a direction corresponding to a movement of the corresponding rollers (7) towards a theoretical rolling axis (L) of the profile to be rolled, and
    counter-means (27) configured to bias the supporting organs into abutment against the thrust means (26) in order to ensure a univocal adjustment positioning of the respective rollers (7).

13. The re-turning plant (11) according to claim 12, wherein said thrust means (26) comprises a hydraulic cylinder-piston assembly (30) for each supporting organ respectively.

14. The re-turning plant (11) according to claim 12, wherein said thrust means (26) comprises a lever mechanism (28) for each supporting organ, respectively.

15. The re-turning plant (11) according to claim 14, wherein the lever mechanisms (28) are driven by hydraulic actuators.

16. The re-turning plant (11) according to claim 1, wherein said supporting organs comprise arms (6) pivoting in the plane of the roller stand (1) about respective hinge pins (8) fixed to the roller stand (1), said rollers are rotatably mounted to said arms (6) and wherein said adjusting means are configured to interact with said arms (6).

17. The re-turning plant (11) according to claim 16, wherein the position of the hinge pins (8) can be adjusted, said re-turning plant (11) comprising rotational adjusting means for adjusting the position of the arms (6) by rotating of the arms about said hinge pin (8) and displacing adjusting means for displacing the hinge pin (8) about which the arm (6) is pivoted.

18. The re-turning plant (11) according to claim 1, wherein the movement of the tool-holding device (13), the movement of the mandrel means (14) and the operation of the adjusting means are automatically driven by means of said control unit (17) of the re-turning plant (11).

19. The re-turning plant (11) according to claim 18, wherein the control unit (17) can be programmed such as to adapt the re-turning process to the type of roller (7), roller stand (1) and nominal diameter of the roller, as desired.

\* \* \* \* \*